(12) United States Patent
Wu et al.

(10) Patent No.: US 8,744,403 B2
(45) Date of Patent: *Jun. 3, 2014

(54) METHOD AND SYSTEM FOR REMOTE CONTROL OF A SMART CARD

(75) Inventors: Chuanxi Wu, Shenzhen (CN); Jingwang Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 130 days.

This patent is subject to a terminal disclaimer.

(21) Appl. No.: 13/258,475

(22) PCT Filed: Dec. 23, 2009

(86) PCT No.: PCT/CN2009/075882
§ 371 (c)(1),
(2), (4) Date: Feb. 28, 2012

(87) PCT Pub. No.: WO2011/022912
PCT Pub. Date: Mar. 3, 2011

(65) Prior Publication Data
US 2012/0149332 A1     Jun. 14, 2012

(30) Foreign Application Priority Data
Aug. 28, 2009  (CN) .......................... 2009 1 0166869

(51) Int. Cl.
*H04M 11/00* (2006.01)
(52) U.S. Cl.
USPC ........ 455/408; 455/414.1; 455/418; 455/466; 379/161; 379/168; 379/48; 709/210; 709/223; 709/203; 713/193; 713/194; 726/17; 726/27; 726/35; 726/36; 340/426.1; 340/438; 340/5.8; 370/270; 370/338
(58) Field of Classification Search
USPC ........ 455/404.2, 410, 414.1, 421, 432, 456.1, 455/418, 422.1, 432.3, 435.1, 466; 370/328–338, 270; 379/161, 168, 184, 379/194, 48, 201.02; 709/203, 210, 223; 713/193, 194; 726/4, 17, 27, 23, 35, 726/36; 340/426.1, 438, 507, 541, 5.8, 6.1
See application file for complete search history.

(56) References Cited

U.S. PATENT DOCUMENTS 5,600,708 A * 2/1997 Meche et al. ................. 455/411
5,898,783 A * 4/1999 Rohrbach .................... 340/5.31
(Continued)

FOREIGN PATENT DOCUMENTS

| CN | 1533207 A | 9/2004 |
|---|---|---|
| CN | 1568069 A | 1/2005 |

(Continued)

OTHER PUBLICATIONS

International Search Report in international application No. PCT/CN2009/075882, mailed on May 27, 2010.

(Continued)

*Primary Examiner* — Quan M Hua
(74) *Attorney, Agent, or Firm* — Oppedahl Patent Law Firm LLC

(57) ABSTRACT

The present disclosure provides a method and system for remote control of a smart card. The method comprises that: a smart card management platform receives a request of locking or unlocking a smart card from a subscriber; and the smart card management platform performs interactive processing with a terminal side according to the request via a mobile network platform, so as to enable the terminal side to perform the locking or unlocking of the smart card. The present disclosure enables the payment subscriber to avoid loss when the terminal is robbed, lost, stolen, or is illegally used seriously, and provide a higher flexibility to the payment system.

9 Claims, 10 Drawing Sheets

(56) References Cited

U.S. PATENT DOCUMENTS

| | | | |
|---|---|---|---|
| 6,542,730 B1* | 4/2003 | Hosain | 455/410 |
| 6,662,023 B1* | 12/2003 | Helle | 455/558 |
| 7,336,974 B2 | 2/2008 | Choi | |
| 2002/0069259 A1* | 6/2002 | Kushwaha et al. | 709/217 |
| 2004/0192388 A1 | 9/2004 | Dupuis et al. | |
| 2005/0153742 A1 | 7/2005 | Choi | |
| 2006/0154663 A1 | 7/2006 | Son et al. | |
| 2008/0070590 A1* | 3/2008 | Miyajima et al. | 455/456.3 |
| 2009/0075630 A1 | 3/2009 | McLean | |
| 2010/0015942 A1* | 1/2010 | Huang et al. | 455/404.1 |
| 2010/0210240 A1 | 8/2010 | Mahaffey et al. | |
| 2012/0149331 A1* | 6/2012 | Wu et al. | 455/411 |
| 2012/0149333 A1* | 6/2012 | Wu et al. | 455/411 |
| 2012/0149357 A1* | 6/2012 | Wu et al. | 455/419 |

FOREIGN PATENT DOCUMENTS

| | | | |
|---|---|---|---|
| CN | 1780485 A | 5/2006 | |
| CN | 1810052 A | 7/2006 | |
| CN | 1819705 A | 8/2006 | |
| CN | 1930901 A | 3/2007 | |
| CN | 1941958 A | 4/2007 | |
| CN | 1980459 A | 6/2007 | |
| CN | 101018375 A | 8/2007 | |
| CN | 101309518 A | 11/2008 | |
| CN | 101499190 A | 8/2009 | |
| EP | 1170969 A1 | 1/2002 | |
| EP | 1220556 A1 | 7/2002 | |
| EP | 2129146 A1 | 12/2009 | |
| JP | 5-89004 A | 4/1993 | |
| JP | 2001-268216 A | 9/2001 | |
| JP | 2002-259869 A | 9/2002 | |
| JP | 2003-70063 A | 3/2003 | |
| JP | 2003-219043 A | 7/2003 | |
| JP | 2004297156 A | 10/2004 | |
| JP | 2004348475 A | 12/2004 | |
| JP | 2005-57366 A | 3/2005 | |
| JP | 2005-167463 A | 6/2005 | |
| JP | 2006-60685 A | 3/2006 | |
| JP | 2006-261990 A | 9/2006 | |
| JP | 2006-524019 A | 10/2006 | |
| JP | 2006-352461 A | 12/2006 | |
| JP | 2007-116716 A | 5/2007 | |
| JP | 2007521739 A | 8/2007 | |
| JP | 2008-500754 A | 1/2008 | |
| JP | 2008-109306 A | 5/2008 | |
| WO | 03094562 A1 | 11/2003 | |
| WO | 2004114698 A1 | 12/2004 | |
| WO | WO 2008092336 | * | 8/2008 |

OTHER PUBLICATIONS

English Translation of the Written Opinion of the International Search Authority in international application No. PCT/CN2009/075882, mailed on May 27, 2010.
International Search Report in international application No. PCT/CN2009/075893, mailed on Jun. 3, 2010.
English Translation of the Written Opinion of the International Search Authority in international application No. PCT/CN2009/075893, mailed on Jun. 3, 2010.
International Search Report in international application No. PCT/CN2009/075888, mailed on Jun. 3, 2010.
English Translation of the Written Opinion of the International Search Authority in international application No. PCT/CN2009/075888, mailed on Jun. 3, 2010.

* cited by examiner

METHOD AND SYSTEM FOR REMOTE CONTROL OF A SMART CARD

TECHNICAL FIELD

The present disclosure relates to a smart card technology, and in particular to a method and system for remote control of a smart card.

BACKGROUND

Electronic payment (electronic payment) refers to circulation and payment of funds which is realized the in a computer network system in the form of electronic data storage and transfer by taking commercial electronic tools and various kinds of electronic money as media and by means of computer and communication technology.

In recent years, along with the combination of the technologies such as the Internet, mobile communication, computers and the like, mobile electronic commerce, represented by the mobile payment emerges as the times require. Being as an emerging electronic payment way, the mobile payment is advantaged in that it can be carried out at anytime and anywhere, conveniently and fast, the payment cost is low, and the like. As long as a consumer has a mobile phone, the consumer can complete financing and transaction, and enjoy the convenience brought about by the mobile payment. Nowadays, a mobile phone payment is becoming a new highlight of the electronic commerce.

Furthermore, a recent survey shows that, 82% respondents is worried that somebody may make a fraud by using the information stored in their mobile phones (including smart cards) if their mobile phones are lost or stolen. Meanwhile, 90% respondents is worried that their own personal data and financial data may be lost after their mobile phones are lost; and 72% respondents admit that the information stored in their mobile phones is very important and irreplaceable. As the subscriber uses the mobile phone to take part in different activities, such as the electronic payment and the like, the lost of the mobile phone is really a disaster for the subscriber. In the survey, 91% respondents indicate that the lost of the mobile phone for the electronic payment will bring serious loss to them. Meanwhile, as people increasingly depend on the mobile phones, operators must make their own subscribers feel secure. It is good to use the mobile phone more widely, but the mobile operators must enhance the security and management level of the personal data information of their subscribers to rip the evil in the bud. Currently, some solutions have been proposed for the case when the mobile phones for the electronic payment are lost and stolen. However, these solutions have certain deficiencies, or the processing after a mobile phone for electronic payment is lost or stolen differs greatly from the current payment flow; or due to insufficient security of the system, the payment information of subscribers is still used by others illegally, thus payment is forged; or the system does not deal with the loss of mobile phones timely, which brings huge losses to the subscribers, making the subscribers feel unsecure. At present, no effective solution has been proposed.

SUMMARY

The present disclosure is proposed based on the problems that: the processing after a mobile phone for electronic payment is lost or stolen differs greatly from the current payment flow; or the system is not secure enough, so payment information of a subscriber is still used by others illegally, resulting in forged payment; or the system does not deal with the loss of a mobile phone timely, which brings huge losses to a subscriber, and makes the subscriber feel unsecure. For this object, the present disclosure mainly aims to provide a method and system for remote control of a smart card in order to solve the above problems.

In order to realize the above object, a method for remote control of a smart card is provided in accordance with one aspect of the present disclosure.

According to the present disclosure, the method for remote control of a smart card comprises: a smart card management platform receives a request of locking or unlocking a smart card from a subscriber; and the smart card management platform performs interactive processing with a terminal side according to the request via a mobile network platform, so as to enable the terminal side to perform the locking or unlocking of the smart card.

Preferably, the terminal side may comprise a mobile station and the smart card.

Preferably, the step that the smart card management platform performs interactive processing with the terminal side according to the request via the mobile network platform may comprise: when the mobile station is in a normal use status, the mobile station receives a locking or unlocking command sent by the mobile network platform; and the mobile station executes the locking or unlocking command to lock or unlock the smart card.

Preferably, after the mobile station performs the locking or unlocking of the smart card, the method may further comprise: the smart card is in a locking or unlocking status.

Preferably, after the smart card is in the locking or unlocking status, the method may further comprise: the mobile station returns a message indicating successful execution to the mobile network platform.

Preferably, the step that the mobile station executes the locking or unlocking command to lock or unlock the smart card may comprise: the mobile station disables function of the smart card through locking hardware of the smart card, and enables the function of the smart card through unlocking the hardware of the smart card; or the mobile station disables or enables the function of the smart card through executing a preinstalled software procedure.

Preferably, the method may further comprise: when the mobile station where the smart card is located is in an off-line status, the smart card is updated to a status of waiting for locking or unlocking.

Preferably, after the smart card is updated to the status of waiting for the locking or unlocking, the method may further comprise that: when the mobile station in the off-line status where the smart card is located recovers to the normal use status and registers with the mobile network platform, the mobile network platform sends the locking or unlocking command to the mobile station where the smart card is located, and the mobile station performs the locking or unlocking command.

Preferably, the off-line status may comprise: the mobile station is in a turned-off status; or the mobile station is not in a service area.

Preferably, after the smart card management platform receives the application from the subscriber, the method may further comprise: the smart card management platform determines whether the smart card is valid.

Preferably, before the smart card management platform performs interactive processing with the terminal side according to the request via the mobile network platform, the method may further comprise: the mobile network platform and the terminal side perform a security authentication.

Preferably, after the smart card management platform receives the request of locking or unlocking the smart card from the subscriber, the method may further comprise: the smart card management platform looks up status information of the mobile station where the smart card is located via the mobile network platform.

Preferably, the step that the smart card management platform looks up the status information of the mobile station where the smart card is located via the mobile network platform may comprise: the smart card management platform looks up and finds the status information of the mobile station based on a mobile identification code and position region information of the mobile station via the mobile network platform.

Preferably, the step of performing the locking or unlocking of the smart card may comprise: performing locking or unlocking of the smart card or payment application of the smart card.

Preferably, the method may further comprise that: when the smart card or the payment application of the smart card is in the locking status, the payment application of the smart card cannot be used normally.

In order to realize the object, according to the other aspect of the present disclosure, a method for remote control of a smart card is provided; the method comprises: when finding that a subscriber uses a smart card illegally or has corrected a deregulation behaviour, a smart card supervising platform notifies a smart card management platform to lock or unlock the smart card; and the smart card management platform performs interactive signalling processing with a terminal side to enable the terminal side to complete locking or unlocking of the smart card.

Preferably, the terminal side may comprise a mobile station and the smart card; the step that the smart card management platform performs interactive signalling processing with the terminal side to enable the terminal side to lock or unlock the smart card may comprise: the smart card management platform looks up status information of the mobile station where the smart card is located via a mobile network platform; when the mobile station is in a normal use status, the mobile network platform sends a locking or unlocking command to the mobile station; and the mobile station executes the locking or unlocking command to lock or unlock the smart card.

Preferably, after the mobile station performs the locking or unlocking command to lock or unlock the smart card, the method may comprise: the mobile station returns a message indicating successful execution to the mobile network platform; and the mobile network platform changes the status of the smart card to a locking or unlocking status.

Preferably, the step that the smart card management platform looks up the status information of the mobile station where the smart card is located via the mobile network platform may comprise: the smart card management platform looks up and finds the status information of the mobile station based on a mobile identification code and position region information of the mobile station via the mobile network platform.

Preferably, after the smart card management platform finds the status information of the mobile station where the smart card is located via the mobile network platform, the method may further comprise: when the mobile station where the smart card is located is in an off-line status, the mobile network platform updates its status to a status of waiting for locking or unlocking.

In order to realize the above object, a system for remote control of a smart card in accordance with another aspect of the present disclosure is provided.

The system comprises: a mobile network platform, configured to send a locking or unlocking command; and a mobile station, configured to execute the locking or unlocking command to lock or unlock the smart card.

Preferably, the system may further comprise a smart card management platform, configured to receive a request from a subscriber and perform signalling interaction with the mobile station via the mobile network platform.

Preferably, the smart card management platform may be used for supervising whether the subscriber uses the smart card illegally or has corrected the deregulation behaviour.

Preferably, the mobile network platform may be further configured to look up status information of the mobile station where the smart card is located.

In order to realize the above object, according to another aspect of the present disclosure, a terminal station is provided. The mobile terminal comprises: a receiving module, configured to receive a request of locking or unlocking a smart card; and an executing module, configured to execute locking or unlocking of the smart card.

Preferably, the locking or unlocking of the smart card may comprise: the locking or unlocking of payment application of the smart card.

Preferably, the terminal station may further comprise: a sending module configured to send a message indicating successful execution.

In order to realize the above object, according to another aspect of the present disclosure, a mobile network platform is provided. The mobile network platform comprises: a sending module, configured to send a locking or unlocking command to a mobile station when the mobile station is in a normal use status; a changing module, configured to change the status of a smart card; and an updating module, configured to update the status of the smart card to a status of waiting for the locking or unlocking when status information indicates that the mobile station where the smart card is located is in an off-line status.

Preferably, the mobile network platform may further comprise: a notifying module, configured to notify a smart card management platform to update the status of the smart card to a locking or unlocking status.

Preferably, the locking or unlocking of the smart card may comprise the locking or unlocking of payment application of the smart card.

According to the present disclosure, the smart card management platform receives a request of locking or unlocking a smart card from a subscriber; and the smart card management platform performs interactive processing with a terminal side according to the request via a mobile network platform, so as to enable the terminal side to perform locking or unlocking of the smart card, therefore solving the problems that: the processing after the mobile phone for electronic payment is lost or stolen differs greatly from the current payment flow; or the system is not secure enough, thus payment information of a subscriber is still used by others illegally, resulting in forged payment; or the system does not deal with the loss of the mobile phone timely, which brings huge losses to a subscriber and makes the subscriber feel unsecure, therefore further avoiding the loss caused when a subscriber terminal for payment is robbed, lost, stolen, or is used illegally seriously, and providing a higher flexibility to the payment system.

DETAILED DESCRIPTION

In view of the problems that: the processing after a mobile phone for electronic payment is lost or stolen differs greatly from the current payment flow; or the system is not secure enough, therefore the payment information of a subscriber is still used by others illegally, which results in forged payment; or the system does not deal with the loss of a mobile phone timely, which brings huge losses to a subscriber and make the subscriber feel unsecure; embodiments of the present application provides a method and system for remote control of a smart card, the embodiments of the present disclosure provide a method and system for remote control of a smart card. The method comprises: a smart card management platform receives a request of locking or unlocking a smart card from a subscriber; and the smart card management platform performs interactive processing with a terminal side according to the request, so as to enable the terminal side to lock or unlock the smart card.

It should be noted that, the embodiments of the present disclosure and the features of the embodiments can be combined with each other in the case of no conflicts. The present disclosure will be described in detail with reference to the drawings and embodiments.

Embodiment 1

A method for remote control of a smart card is provided in accordance with an embodiment of the present disclosure.

Figure 1:
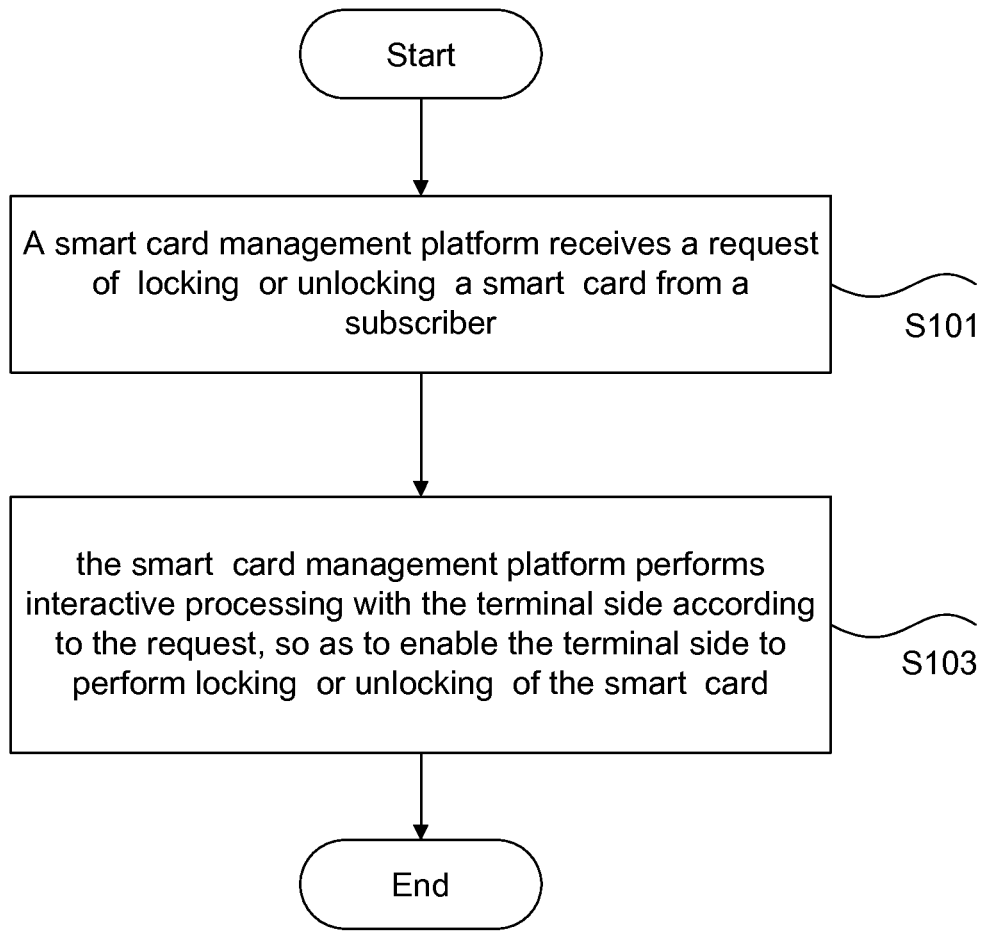
FIG. 1 shows a flowchart of a method for remote control of a smart card in accordance with an embodiment of the present disclosure.

FIG. 1 shows a flowchart of a method for remote control of a smart card in accordance with the embodiment of the present disclosure.

As shown in the FIG. 1, the method comprises the steps S101 and S103:

step S101, the smart card management platform receives a request of locking or unlocking a smart card from a subscriber; and step S103, the smart card management platform performs interactive processing with the terminal side according to the request, so as to enable the terminal side to lock or unlock the smart card.

The realization process of the embodiment of the present disclosure will be described in detail in combination with examples.

Figure 3:
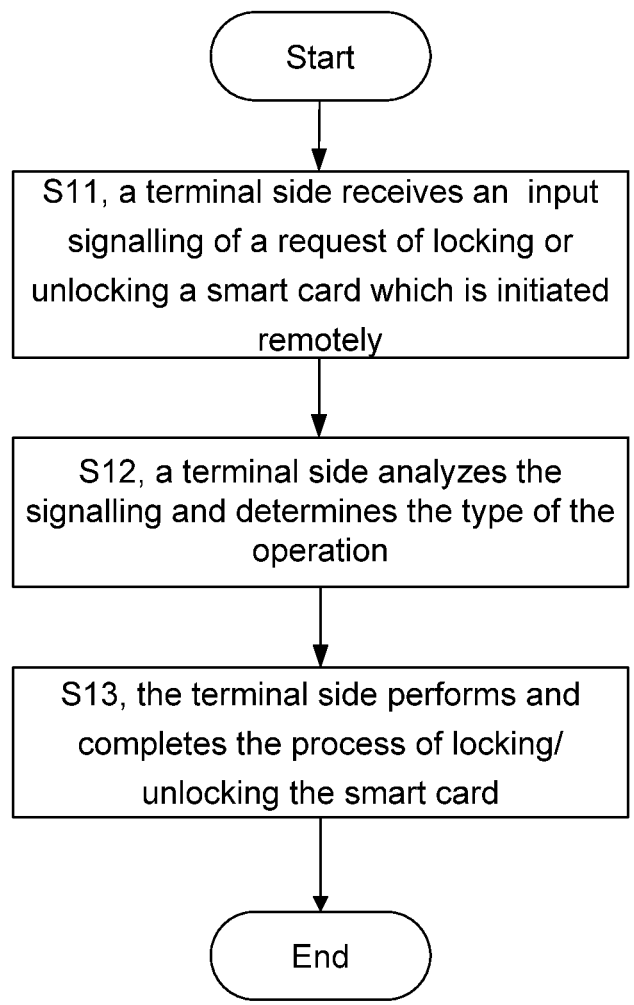
FIG. 3 shows a preferred flowchart of a method for remote control of a smart card in accordance with an embodiment of the present disclosure.

FIG. 3 shows a preferred flowchart of a method for remote control of a smart card in accordance with the embodiment of the present disclosure; as shown in the FIG. 3, the method for remote control of a smart card in the example comprises that:

step S11, if a smart card supervising mechanism (such as a payment system platform, a payment application management platform or a smart card management platform) finds that the subscriber uses the smart card illegally or has corrected the deregulation behaviour, the smart card supervising mechanism notifies the mobile network platform to process this case;

step S12, the mobile network platform performs interactive signalling processing with the terminal side (terminal, smart card);

step S13, the terminal side (terminal, smart card) completes the locking/unlocking of the smart card.

The essence of the present disclosure is that, the mobile network platform sends out an air signalling and interacts with the mobile terminal to trigger the pre-existing security characteristic and device thereof contained in the mobile station or the smart card, so as to complete the locking or unlocking (or called forbidding or enabling) of the smart card, wherein the security characteristic may include the locking of the smart card, the locking of the payment application function of the smart card, and the locking of the using of the terminal which comprises the locking of using the keyboard for the terminal, the hanging-up of the terminal, the unbootable performance terminal, alarm of the terminal and the like.

By adopting the method, when the smart card and the mobile station where the smart card is located, are robbed, lost, stolen, or are illegally used seriously, the subscriber and the smart card supervising department can perform the air signalling locking and unlocking to the smart card and the terminal, and lock and unlock the smart card via the mobile network platform, so as to protect the security of the subscriber and the department relevant to the smart card to the maximum extent and provide a higher flexibility to a payment system.

According to one aspect of the present disclosure, a method for remote control of the smart card based on an electronic payment service is provided.

Figure 2:
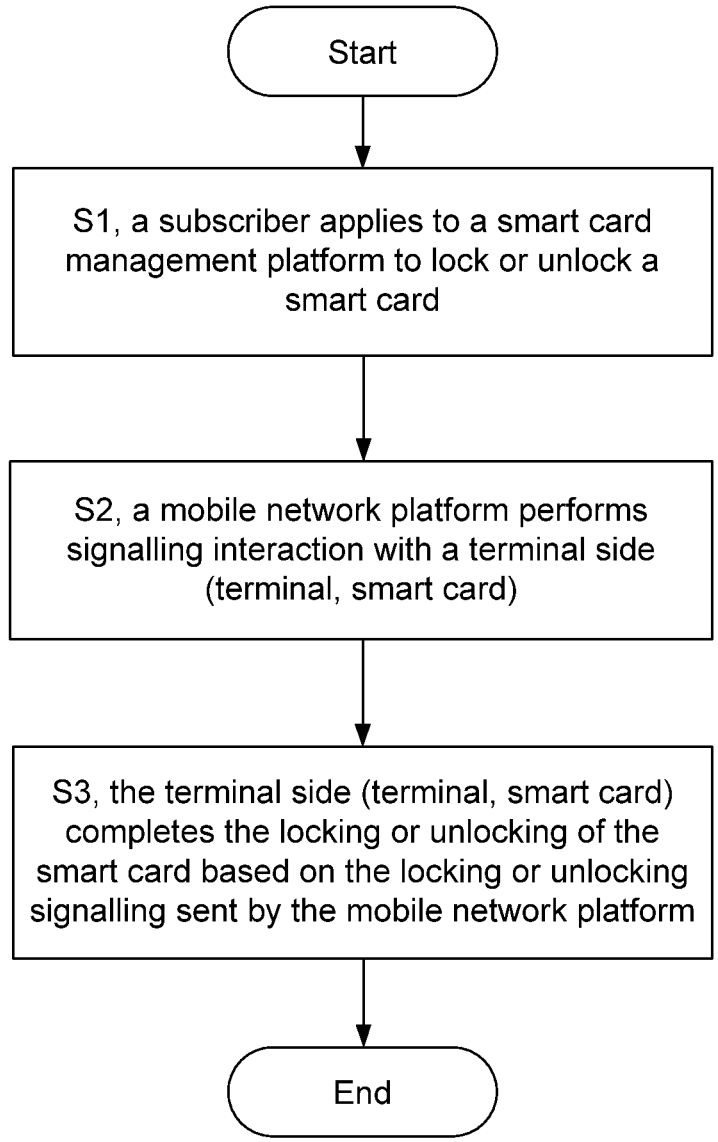
FIG. 2 shows a preferred flowchart of a method for remote control of a smart card in accordance with an embodiment of the present disclosure.
Figure 4:
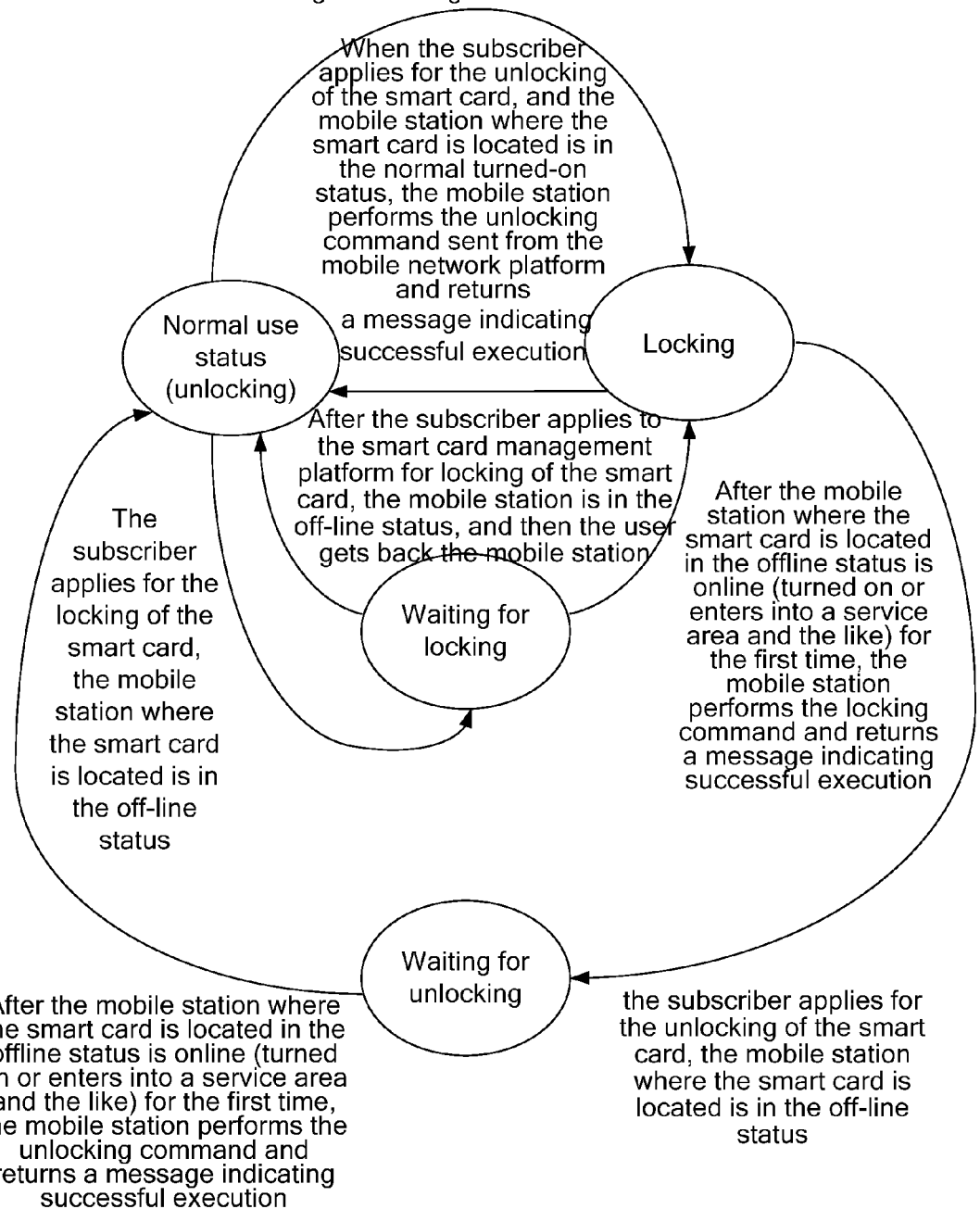
FIG. 4 shows a schematic diagram of a status machine at a network side in accordance with an embodiment of the present disclosure.

FIG. 2 shows a preferred flowchart of a method for remote control of a smart card in accordance with the embodiment of the present disclosure; FIG. 4 shows a schematic diagram of a status machine at the network side in accordance with the embodiment of the present disclosure; and FIG. 5 shows a schematic diagram of a status machine at the terminal side in accordance with the embodiment of the present disclosure.

Figure 5:
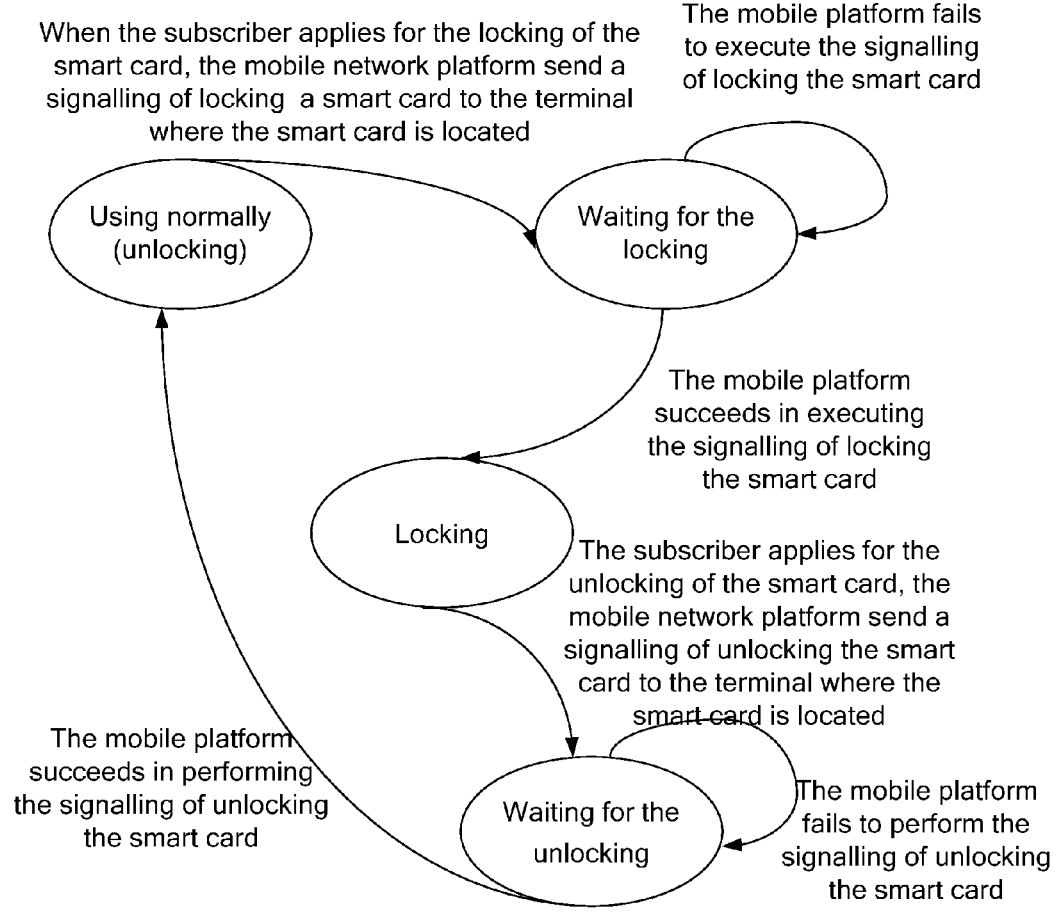
FIG. 5 shows a schematic diagram of a status machine at a terminal side in accordance with an embodiment of the present disclosure.

As shown in FIG. 2 and referring to FIG. 4 and FIG. 5, the method for remote control of a smart card comprises that:

step S1, the subscriber applies to the smart card management platform for locking or locking the smart card;

step S2, the mobile network platform performs interactive signalling processing with the terminal side (terminal, smart card); and step S3, the terminal completes the locking/unlocking of the smart card.

Figure 7:
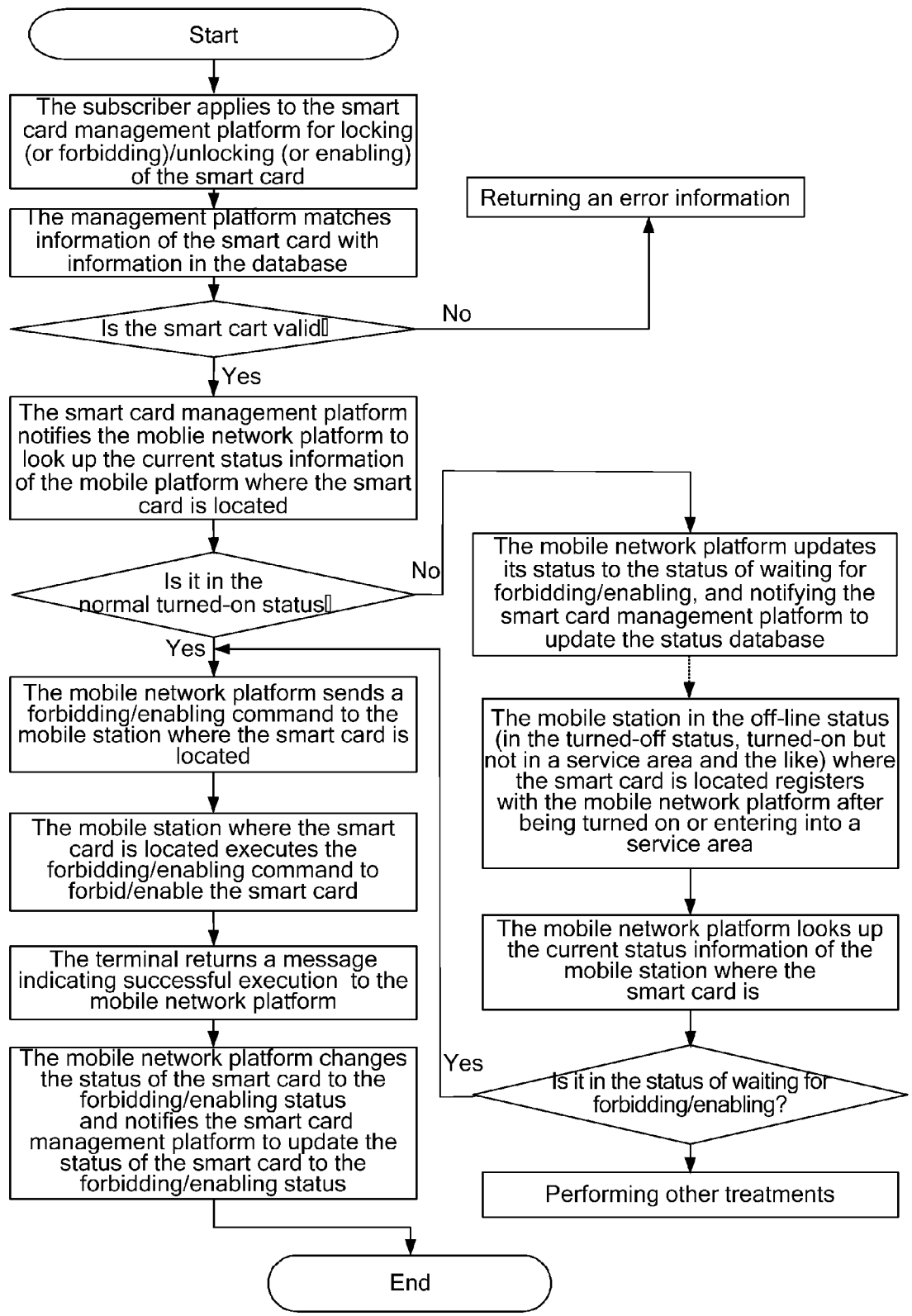
FIG. 7 shows a preferred flowchart of a method for remote control of a smart card in accordance with an embodiment of the present disclosure.

FIG. 7 shows a preferred flowchart of a method for remote control of a smart card in accordance with the embodiment of the present disclosure; and referring to the FIG. 7, the above step S2 may comprise the follows:

step S100, after receiving the request of locking or unlocking the smart card (the request of locking or unlocking the smart card is sent to the smart card management platform) sent from the subscriber to the smart card management platform, the management platform matches information of the smart card with information in the database; if the smart card is invalid, the management platform returns a failure message and the processing process is ended; and if the smart card is valid, the next step is executed;

step S102, the smart card management platform looks up the current status information of the mobile station where the smart card is located via the mobile network platform; if the mobile station where the smart card is located is in a normal turned-on status, the mobile network platform directly sends the locking/unlocking command to the mobile station where the smart card is located, the mobile station where the smart card is located returns a success message to the mobile network platform after executing the locking/unlocking command to lock/unlock the smart card, and the mobile network platform changes the status of the smart card to the locking/unlocking status and notifies the smart card management platform to update the status of the smart card to the locking/unlocking status; if the mobile station where the smart card is located is in an off-line status (in a turned-off status, in a turned-on status but not in a service area and the like), the mobile network platform updates its status to the status of waiting for locking/unlocking and notifies the smart card management platform to update the status database at the same time; and step S104, when the mobile station in the off-line status (in a turned-off status, in a turned-on status but not in a service area and the like) where the smart card is located registered with the mobile network platform after being turned on or entering into a service area, the mobile network platform makes a query and finds that the mobile station where the smart card is located is in the status of waiting for locking/unlocking and sends the locking/unlocking command to the mobile station where the smart card is located; after the mobile station executes the locking/unlocking command to lock/unlock the smart card, the mobile station returns a success message to the mobile network platform, and the mobile network platform updates its status to the locking/unlocking status, and notifies the smart card management platform to synchronize the status database.

The method should comprise a security authentication process to confirm that the locking/unlocking command is sent form the smart card management platform before the mobile station where the smart card is located executes the locking/unlocking command sent from the mobile network platform in the step S102/S104.

In the embodiment of the present disclosure, the step that the request of locking the smart card is sent from the subscriber to the smart card management platform corresponds to the subsequent locking operation; and the step that the request of unlocking the smart card is sent from the subscriber to the smart card management platform corresponds to the subsequent unlocking operation.

Figure 6:
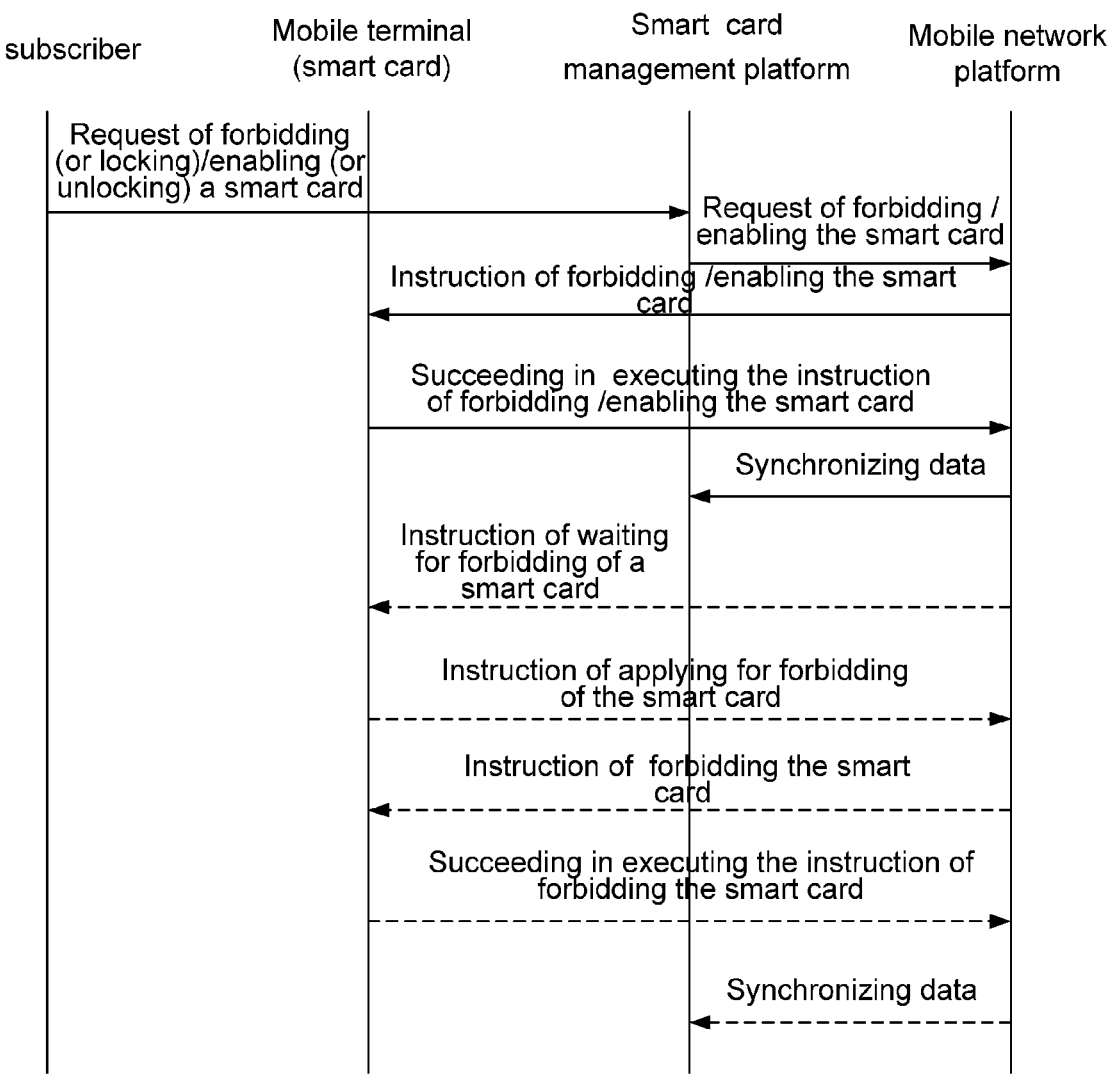
FIG. 6 shows a schematic diagram of signalling interaction in a system in accordance with an embodiment of the present disclosure.

FIG. 6 shows a schematic diagram of signalling interaction in a system in accordance with the embodiment of the present disclosure; as shown in the FIG. 6, the signalling interaction is realized between the subscriber and the mobile network platform through the shown signalling.

In the step S102 of the method, that the mobile station where the smart card is located executes the locking/unlocking command to lock/unlock the smart card comprises:

step 201, disabling the smart card through locking the physic hardware (device) and disabling the payment of the smart card through locking the physic hardware (device); or enabling the smart card through unlocking the physic hardware (device) and enabling the payment of the smart card through unlocking the physic hardware (device); and step S202, disabling the smart card through performing the preinstalled software procedure (device) and disabling the payment of the smart card through executing the preinstalled software procedure (device); or enabling the smart card through executing the preinstalled software procedure (device) and enabling the payment of the smart card through executing the preinstalled software procedure (device).

The preinstalled software procedure (device) in the above step S202 can be preinstalled in either the smart card or the mobile station where the smart card is located.

A software procedure is preinstalled in the terminal where the smart card is located, and the step of executing the locking/unlocking command by the mobile station comprises the following steps:

step S300, destroying the payment data in the smart card; and step S302, executing the program of locking/unlocking the smart card by the preinstalled software procedure in the terminal.

The software procedure is preinstalled in the smart card, and the step of executing the locking/unlocking command by the mobile station comprises the following steps:

step S402, copying the preinstalled software procedure in the smart card, which is a program of locking/unlocking the smart card, into the terminal;

step S404, destroying the payment data in the smart card; and step S406, executing the copied software procedure in the terminal, which is a back-up program of locking/unlocking the smart card.

In addition, in the step S102, the smart card management platform looks up the current status information of the mobile station where the smart card is located via the mobile network platform, and the mobile network platform finds the status information of the mobile station based on a mobile identification code and the position region information of the mobile station.

In the step S104, when the mobile station in the off-line status (in a turned-off status, in a turned-on status but not in a service area and the like) where the smart card is located is registers with the mobile network platform after being turned-on or entering into a service area, the mobile network platform makes a query and finds that the mobile station where the smart card is located is in the status of waiting for locking/unlocking, sends a notification message to the smart card management platform, and sends the locking/unlocking command to the mobile station where the smart card is located; after the mobile station executes the locking/unlocking command to lock/unlock the smart card, the mobile station returns a success message to the mobile network platform; and the mobile network platform updates its status to the locking/unlocking status and notifies the smart card management platform to synchronize the status database.

Figure 8:
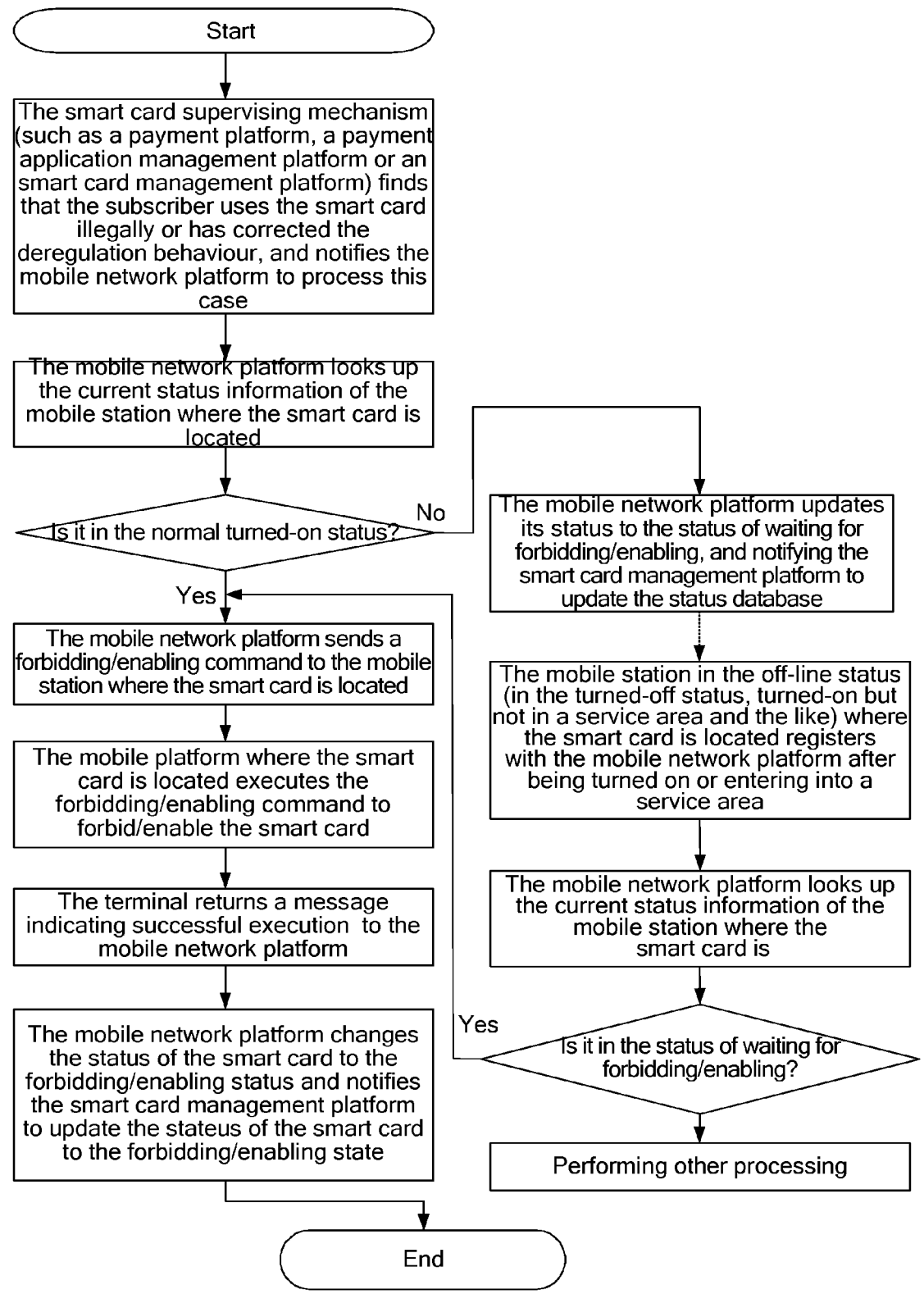
FIG. 8 shows a preferred flowchart of a method for remote control of a smart card in accordance with an embodiment of the present disclosure.

According to another aspect of the present disclosure, a method for locking or unlocking the smart card remotely based on an electronic payment service is provided. FIG. 3 shows a preferred flowchart of a method for remote control of a smart card in accordance with the embodiment of the present disclosure. FIG. 8 shows a preferred flowchart of a method for remote control of a smart card in accordance with the embodiment of the present disclosure. As shown in FIG. 3 and referring to FIG. 8, the method for remote control of a smart card in the embodiment comprises that:

step S11, the smart card supervising mechanism (such as a payment system platform, a payment application management platform or a smart card management platform), when finding that the subscriber uses the smart card illegally or has corrected a deregulation behaviour, notifies the mobile network platform to process this case;

step S12, the mobile network platform performs interactive signalling processing with the terminal side (terminal, smart card); and step S13, the terminal side (terminal, smart card) completes the locking/unlocking of the smart card.

In the embodiment of the present disclosure, when it is found that the subscriber uses the smart card illegally, the subsequent locking operation is performed correspondingly; and when it is found that the subscriber has corrected the deregulation behaviour, the subsequent unlocking operation is performed correspondingly.

Step S11 may comprise the following processes that:

step S502, the smart card management platform notifies the mobile network platform to look up the current status information of the mobile station where the smart card is located; if the mobile station where the smart card is located is in the normal turned-on status, the mobile network platform directly sends the locking/unlocking command to the mobile station where the smart card is located, the mobile station where the smart card is located returns a success message to the mobile network platform after executing the locking/unlocking command to lock/unlock the smart card, and the mobile network platform changes the status of the smart card to the locking/unlocking status and notifies the smart card management platform to update the status of the smart card to the locking/unlocking status; if the mobile station where the smart card is located is in the off-line status (in a turned-off status, in a turned-on status but not in a service area and the like), the mobile network platform updates its status to the status of waiting for locking/unlocking and notifies the smart card management platform to update the status database; and step S504, when the mobile station in the off-line status (in a turned-off status, in a turned-on status but not in a service area and the like) where the smart card is located registers with the mobile network platform after being turned on or entering into a service area, the mobile network platform makes a query and finds that the mobile station where the smart card is located is in the status of waiting for locking/unlocking and sends the locking/unlocking command to the mobile station where the smart card is located; after the mobile station executes the locking/unlocking command to lock/unlock the smart card, the mobile station returns a success message to the mobile network platform, and the mobile network platform updates its status to the locking/unlocking status and notifies the smart card management platform to synchronize the status database.

The method should comprise a security authentication process to confirm that the locking/unlocking command is sent form the smart card management platform before the mobile station where the smart card is located executes the locking/unlocking command sent from the mobile network platform in the step S502/S504.

In the step S502 of the method, that the mobile station where the smart card is located executes the locking/unlocking command to lock/unlock the smart card comprises:

step S601, disabling the smart card through locking the physic hardware (device) and disabling the payment of the smart card through locking the physic hardware (device); or enabling the smart card through unlocking the physic hardware (device) and enabling the payment of the smart card through unlocking the physic hardware (device); and step S602, disabling the smart card through executing the preinstalled software procedure (device) and disabling the payment of the smart card through performing the preinstalled software procedure (device); or enabling the smart card through executing the preinstalled software procedure (device) and enabling the payment of the smart card through executing the preinstalled software procedure (device).

The preinstalled software procedure (device) in the above step S602 can be preinstalled in either the smart card or the mobile station where the smart card is located.

The description of the step S12 refers to the description of the above step S2.

A software procedure is preinstalled in the terminal where the smart card is located, and the step of executing the locking/unlocking command by the mobile station comprises the following steps:

step S700, destroying the payment data in the smart card; and step S702, executing the preinstalled software procedure in the terminal, which is the program of locking/unlocking the smart card.

The software procedure is preinstalled in the smart card; and the step of executing the locking/unlocking command by the mobile station comprises the following steps:

step S802, copying the preinstalled software procedure in the smart card, which is a program of locking/unlocking the smart card, into the terminal;

step S804, destroying the payment data in the smart card; and step S806, executing the copied software procedure in the terminal, which is a back-up program of locking/unlocking the smart card.

In addition, in the step S502, the smart card management platform looks up the current status information of the mobile station where the smart card is located via the mobile network platform, and the mobile network platform finds the status information of the mobile station based on the mobile identification code and the position region information of the mobile station.

In the step S504, when the mobile station in the off-line status (in a turned-off status, in a turned-on status but not in a service area and the like) where the smart card is located registers with the mobile network platform after being turned-on or entering into a service area, the mobile network platform makes a query and finds that the mobile station where the smart card is located is in the status of waiting for locking/unlocking, sends a notification message to the smart card management platform, and sends the locking/unlocking command to the mobile station where the smart card is located; after the mobile station executes the locking/unlocking command to lock/unlock the smart card, the mobile station returns a success message to the mobile network platform, and the mobile network platform updates its status to the locking/unlocking status and notifies the smart card management platform to synchronize the status database.

According to another aspect of the present disclosure, a device for locking and unlocking the smart card remotely based on the electronic payment service is provided. The device comprises:

a requesting device, configured to obtain a request from a subscriber;

a communicating device, configured for a mobile network platform to process interaction between the mobile network platform and the mobile station, and process communication and data synchronization between the mobile network platform and the card management platform and the like; and an executing device, configured for the mobile station executing locking and unlocking of the smart card.

As above, the smart card comprises, but not limited to: a sim card, a R-UIM card, a usim card, a csim card, a UICC card, a java card, a financial card, a traffic card, a prepaid card and combined cards of the above cards.

The mobile terminal comprises, but not limited to: terminal applying to GSM, CDMA, WCDMA, Td-Scdma, cdma2000, data card, fixing station, LTE, LTE+ and the like and a dual-mode or multi-mode terminal of any combination thereof.

According to the embodiment of the present disclosure, a system for remote control of a smart card is provided.

Figure 9:
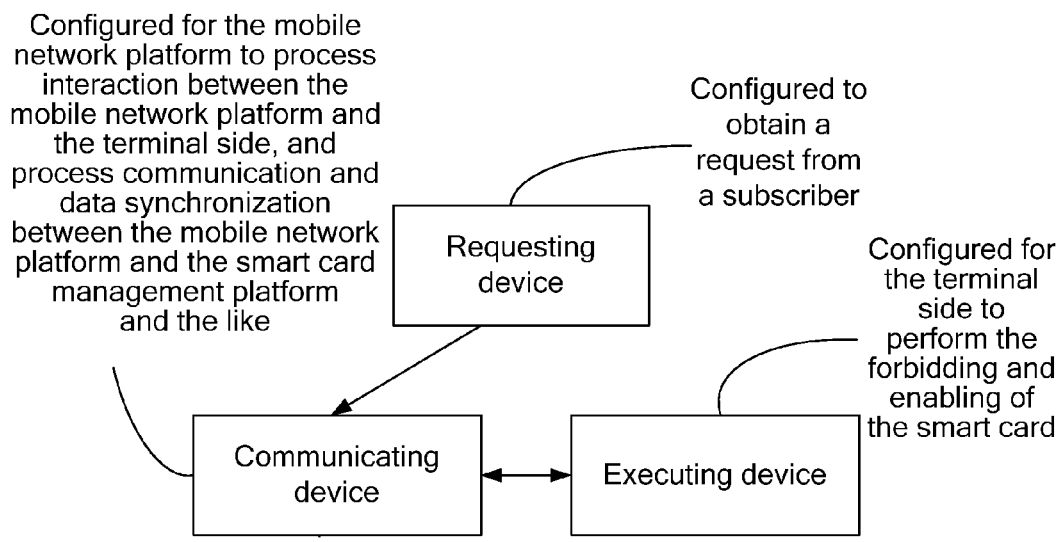
FIG. 9 shows a schematic diagram of a preferred system for remote control of a smart card in accordance with an embodiment of the present disclosure.

FIG. 9 shows a schematic diagram of a preferred system for remote control of a smart card in accordance with the embodiment of the present disclosure.

As shown in FIG. 9, the system comprises: a requesting device, a communicating device and an executing device.

Specifically, the requesting device is configured to obtain a request from a subscriber; the communicating device is configured for the mobile network platform to process information interaction between the mobile network platform and the mobile station, and perform communication and data synchronization between the mobile network platform and the card management platform and the like; and the executing device is configured to perform locking and unlocking of a smart card.

Figure 10:
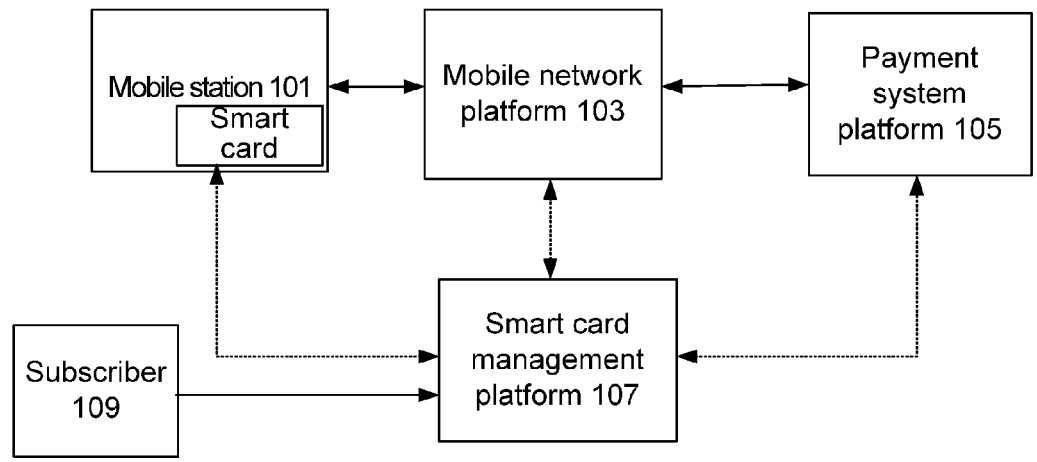
FIG. 10 shows a schematic diagram of a preferred system for remote control of a smart card in accordance with an embodiment of the present disclosure.

FIG. 10 shows a schematic diagram of a preferred system for remote control of a smart card in accordance with the embodiment of the present disclosure.

As shown in FIG. 10, the system comprises: a mobile network platform 103, a mobile station 101, a smart card management platform 107, and a payment system platform 105, wherein both the mobile network platform 103 and the smart card management platform 107 are connected with the payment system platform 105.

The mobile network platform 103 is configured to send a locking or unlocking command to the mobile station 101; the mobile station 101 is configured to execute the locking or unlocking command to lock or unlock the smart card.

Preferably, when the subscriber 109 applies to the smart card management platform 107 for locking or unlocking the smart card, the smart card management platform 107 looks up the current status information of the mobile station where the smart card is located via the mobile network platform 103; if the mobile station where the smart card is located is in the normal turned-on status, the mobile network platform 103 directly sends the locking/unlocking command to the mobile station 101 where the smart card is located, the mobile station 101 where the smart card is located returns a success message to the mobile network platform 103 after executing the locking/unlocking command to lock/unlock the smart card, and the mobile network platform 103 changes the status of the smart card to the locking/unlocking status and notifies the smart card management platform 107 to update the status of the smart card to the locking/unlocking status; if the mobile station 101 where the smart card is located is in the off-line status (in a turned-off status, in a turned-on status but not in a service area and the like), the mobile network platform 103 updates its status to the status of waiting for locking/unlocking and notifies the smart card management platform 107 to update the status database at the same time.

Figure 11:
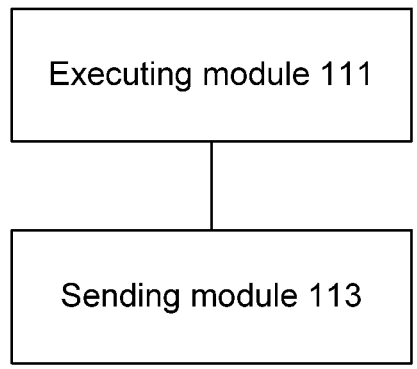
FIG. 11 shows a schematic diagram of a mobile station in accordance with an embodiment of the present disclosure.

FIG. 11 shows a schematic diagram of a mobile station in accordance with the embodiment of the present disclosure.

As shown in FIG. 11, the mobile station comprises: an executing module 111 and a sending module 113.

The executing module 111 is configured to execute locking or unlocking of the smart card; and the sending module 113 is configured to send a message of changing successfully.

Figure 12:
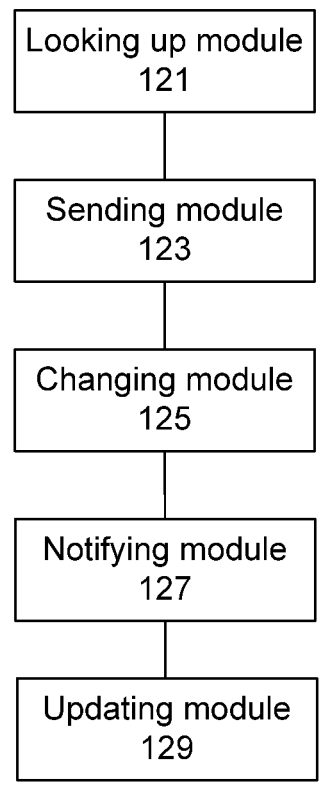
FIG. 12 shows a schematic diagram of a mobile network platform in accordance with an embodiment of the present disclosure.

FIG. 12 shows a schematic diagram of a mobile network platform in accordance with the embodiment of the present disclosure.

As shown in FIG. 12, the mobile network platform comprises: a looking up module 121, a sending module 123, a changing module 125, a notifying module 127 and an updating module 129.

Specifically, the looking up module 121 is configured to look up the status information of the mobile station where the smart card is located; the sending module 123 is configured to send a locking or unlocking command to the mobile station when the status information of the mobile station indicates that the mobile station where the smart card is located is in the normal use status; the changing module 125 is configured to change the status of the smart card to the locking or unlocking status; the notifying module 127 is configured to notify the smart card management platform to update the status of the smart card to the locking or unlocking status; and the updating module 129 is configured to update its status to the status of waiting for the locking or unlocking when the status information of the mobile station indicates that the mobile station where the smart card is located is in the off-line status.

It can be seen from the above description that, the present disclosure can avoid the loss when the payment subscriber terminal is robbed, lost, stolen, or is illegally used seriously, and provide a higher flexibility to a payment system.

The above is only the preferred embodiment of the present disclosure and not intended to limit the scope of protection of the present disclosure. For those skilled in the art, the present disclosure has various changes and modifications. Any modifications, equivalent replacements, improvements and the like within the spirit and principle of the present disclosure shall fall within the scope of protection of the present disclosure.

The invention claimed is:

1. A method for remote control of a smart card, comprising:
performing, by a smart card management platform, signalling interaction with a mobile station via a mobile network platform of a mobile network after the smart card management platform receiving a request of locking or unlocking a smart card from a subscriber, wherein the smart card is located in the mobile station, and wherein the smart card management platform stores dynamic data indicative of operation statuses of the smart card, the statuses of the smart card comprising a status of locking, a status of unlocking, a status of waiting for locking, and a status of waiting for unlocking, responsive to said request, querying a current operation status of the mobile station by the smart card management platform using the mobile station's identification and location information via the mobile network platform;

controlling, by the smart card management platform via the mobile network platform, the mobile station to perform a locking or unlocking operation of the smart card based on a result of said query and in response changing the status of the smart card accordingly, wherein the controlling comprises:

signalling, by the smart card management platform, the mobile station that is currently connected to the mobile network to perform a locking operation in response to the query result; and changing the status of the smart card from unlocking to locking;

signalling, by the smart card management platform, the mobile station that is currently connected to the mobile network to perform an unlocking operation in response to the query result; and changing the status of the smart card from locking to unlocking;

updating, by the smart card management platform, the status of the smart card from an unlocking to waiting for locking status in response to detecting the mobile station is currently in an off-line state, and in response to the mobile station being connected to the mobile network and having a waiting for locking status registered at the smart card management platform, signalling the mobile station to perform a locking operation;

updating, by the smart card management platform, the status of the smart card from a locking to waiting for unlocking status in response to detecting the mobile station is currently in an off-line state, and in response to the mobile station being connected to the mobile network and having a waiting for unlocking status registered at the smart card management platform, signalling the mobile station to perform an unlocking operation;

wherein the off-line state of the mobile station indicates that the mobile station is turned off or not in a service area.

2. The method according to claim 1, further comprising:

returning, by the mobile station, a message indicating successful execution to the mobile network platform after the mobile station performs the locking or unlocking of the smart card.

3. The method according to claim 1, wherein the mobile station executing the locking or unlocking command to lock or unlock the smart card comprises:

the mobile station disables function of the smart card through locking hardware of the smart card, and enables the function the smart card through unlocking the hardware of the smart card; or the mobile station disables or enables the function of the smart card through executing a preinstalled software procedure.

4. The method according to claim 1, further comprising: after the smart card management platform receives the request from the subscriber, determining, by the smart card management platform, whether the smart card is valid;

the method further comprising: before the smart card management platform performs interaction with the mobile station via the mobile network platform, performing a security authentication between the mobile network platform and the mobile station.

5. The method according to claim 1, wherein the step of performing the locking or unlocking of the smart card comprises:

performing locking or unlocking of the smart card or payment application of the smart card;

the method further comprise: when the smart card or the payment application of the smart card is in the locking status, the payment application of the smart card cannot be used normally.

6. A method for locking or unlocking a smart card remotely, comprising:

performing, by a smart card management platform, signalling interaction with a mobile station via a mobile network platform of a mobile network after the smart card management platform receiving a notification from a smart card supervising platform that the smart card supervising platform finds a subscriber uses a smart card illegally or has corrected a deregulation behaviour, wherein the smart card is located in the mobile station, and wherein the smart card management platform stores dynamic data indicative of operation statuses of the smart card, the statuses of the smart cards comprising a status of locking, a status of unlocking, a status of waiting for locking, and a status of waiting for unlocking;

responsive to said notification, querying a current operation status of the mobile station by the smart card management platform using the mobile station's identification and location information via the mobile network platform;

controlling, by the smart card management platform via the mobile network platform, the mobile station to perform a locking or unlocking operation of the smart card based on a result of said query and in response changing the status of the smart card accordingly, wherein the controlling comprises:

signalling, by the smart card management platform, the mobile station that is currently connected to the mobile network to perform a locking operation in response to the query result; and changing the status of the smart card from unlocking to locking, signalling, by the smart card management platform, the mobile station that is currently connected to the mobile network to perform an unlocking operation in response to the query result; and changing the status of the smart card from locking to unlocking, updating, by the smart card management platform, the status of the smart card from an unlocking to waiting for locking status in response to detecting the mobile station is currently in an off-line state, and in response to the mobile station being connected to the mobile network and having a waiting for locking status registered at the smart card management platform, signalling the mobile station to perform a locking operation, updating, by the smart card management platform, the status of the smart card from a locking to waiting for unlocking status in response to detecting the mobile station is currently in an off-line state, and in response to the mobile station being connected to the mobile network and having a waiting for unlocking status registered at the smart card management platform, signalling the mobile station to perform an unlocking operation;

wherein the off-line state of the mobile station indicates that the mobile station is turned off or not in a service area.

7. The method according to claim 6, further comprising: after the mobile station executes the locking or unlocking operation to lock or unlock the smart card, returning, by the mobile station, a message indicating successful execution to the mobile network platform.

8. A system for locking and unlocking a smart card remotely, comprising:

a mobile station comprising an antenna, wherein the smart card is located in the mobile station;

a mobile network platform of a mobile network; and a smart card management platform, storing dynamic data indicative of operation statuses of the smart card, the statuses of the smart card comprising a status of locking, a status of unlocking, a status of waiting for locking, and a status of waiting for unlocking;
wherein the
smart card management platform is configured to
receive a request of locking or unlocking the smart card from a subscriber, or receive information that the subscriber uses the smart card illegally or has corrected a deregulation behaviour which is sent from a smart card supervising platform,
perform signalling interaction with the mobile station via the mobile network platform,
responsive to said request, query a current operation status of the mobile station using the mobile station's identification and location information via the mobile network platform, and
control the mobile station to perform a locking or unlocking operation of the smart card via the mobile network platform based on a result of said query and in response changing the status of the smart card accordingly,
wherein the controlling comprises:
signalling, by the smart card management platform, the mobile station that is currently connected to the mobile network to perform a locking operation in response to the query result; and changing the status of the smart card from unlocking to locking;
signalling, by the smart card management platform, the mobile station that is currently connected to the mobile network to perform an unlocking operation in response to the query result; and changing the status of the smart card from locking to unlocking;
updating, by the smart card management platform, the status of the smart card from an unlocking to waiting for locking status in response to detecting the mobile station is currently in an off-line state, and in response to the mobile station being connected to the mobile network and having a waiting for locking status registered at the smart card management platform, signalling the mobile station to perform a locking operation;
updating, by the smart card management platform, the status of the smart card from a locking to waiting for unlocking status in response to detecting the mobile station is currently in an off-line state, and in response to the mobile station being connected to the mobile network and having a waiting for unlocking status registered at the smart card management platform, signalling the mobile station to perform an unlocking operation;
wherein the off-line state of the mobile station indicates that the mobile station is turned off or not in a service area.

9. A system for locking and unlocking a smart card remotely, comprising:
a mobile network platform of a mobile network, comprising a circuitry, and
a smart card management platform, storing dynamic data indicative of operation statuses of the smart card, the statuses of the smart card comprising a status of locking, a status of unlocking, a status of waiting for locking, and a status of waiting for unlocking;
wherein the smart card management platform is configured to:
receive a request of locking or unlocking the smart card from a subscriber, or receive information that the subscriber uses the smart card illegally or has corrected a deregulation behaviour which is sent from a smart card supervising platform,
perform signalling interaction with a mobile station via the mobile network platform, wherein the smart card is located in the mobile station,
responsive to said request, query a current operation status of the mobile station using the mobile station's identification and location information via the mobile network platform, and
control the mobile station to perform a locking or unlocking operation of the smart card via the mobile network platform based on a result of said query and in response changing the status of the smart card accordingly;
wherein the controlling comprises:
signalling, by the smart card management platform, the mobile station that is currently connected to the mobile network to perform a locking operation in response to the query result; and changing the status of the smart card from unlocking to locking,
signalling, by the smart card management platform, the mobile station that is currently connected to the mobile network to perform an unlocking operation in response to the query result; and changing the status of the smart card from locking to unlocking;
updating, by the smart card management platform, the status of the smart card from an unlocking to waiting for locking status in response to detecting the mobile station is currently in an off-line state, and in response to the mobile station being connected to the mobile network and having a waiting for locking status registered at the smart card management platform, signalling the mobile station to perform a locking operation;
updating, by the smart card management platform, the status of the smart card from a locking to waiting for unlocking status in response to detecting the mobile station is currently in an off-line state, and in response to the mobile station being connected to the mobile network and having a waiting for unlocking status registered at the smart card management platform, signalling the mobile station to perform an unlocking operation;
wherein the off-line state of the mobile station indicates that the mobile station is turned off or not in a service area.

* * * * *